US012632355B2

(12) United States Patent
Srinivasan

(10) Patent No.: US 12,632,355 B2
(45) Date of Patent: May 19, 2026

(54) SYSTEM AND METHOD TO MONITOR PROGRAMMABLE LOGIC CONTROLLER (PLCS) IN A CYBER PHYSICAL ENVIRONMENT

(71) Applicant: TDI Novus, Inc., Philadelphia, PA (US)

(72) Inventor: Avinash Srinivasan, Severna Park, MD (US)

(73) Assignee: TDI Novus, Inc., Philadelphia, PA (US)

( * ) Notice: Subject to any disclaimer, the term of this patent is extended or adjusted under 35 U.S.C. 154(b) by 120 days.

(21) Appl. No.: 18/400,521

(22) Filed: Dec. 29, 2023

(65) Prior Publication Data

US 2024/0220382 A1    Jul. 4, 2024

Related U.S. Application Data

(60) Provisional application No. 63/477,945, filed on Dec. 30, 2022.

(51) Int. Cl.
*G06F 11/28* (2006.01)
(52) U.S. Cl.
CPC .................................... *G06F 11/28* (2013.01)
(58) Field of Classification Search
None
See application file for complete search history.

(56) References Cited

U.S. PATENT DOCUMENTS

| | | | | |
|---|---|---|---|---|
| 5,699,046 A | * | 12/1997 | Accolla .............. | G08B 13/2471 |
| | | | | 340/10.5 |
| 2015/0113509 A1 | * | 4/2015 | Faraj ................... | G06F 9/44526 |
| | | | | 717/124 |
| 2019/0370671 A1 | * | 12/2019 | Martinez Canedo .... | G06N 5/04 |
| 2021/0233383 A1 | * | 7/2021 | Roark .................. | H04L 9/3226 |
| 2021/0258652 A1 | * | 8/2021 | Li ........................ | H04L 65/612 |
| 2021/0359925 A1 | * | 11/2021 | Báder .................. | H04W 24/04 |
| 2022/0253037 A1 | * | 8/2022 | Colosimo .......... | G05B 19/4065 |
| 2023/0135013 A1 | * | 5/2023 | Wang ....................... | G06F 8/65 |
| | | | | 718/102 |

* cited by examiner

*Primary Examiner* — Raqiul A Choudhury
(74) *Attorney, Agent, or Firm* — Barley Snyder

(57) ABSTRACT

An anomaly monitoring system for a cyber-physical environment having at least one programmable logic controller (PLC) and a monitored component, the monitoring system having a human machine interface, a separate controller with at least a processor and associated memory, and providing a communication network for electronic communication between components of the cyber-physical environment, the anomaly monitoring system providing at least one plugin module to monitor the performance of the component and the PLC, as provided through the communication network through a PLC data collection module, the plugin comparing the data from the PLC data collection module to a model of learned behavior patterns, and thereby classify reviewed data as being normal or anomaly events.

13 Claims, 10 Drawing Sheets

```
[root@ts1 cyft-monitor-plugins]# ./app_monitor.sh
******** Initialization In Progress ********
********** Initialization Complete **********
**** Press CNTRL + C to STOP Monitoring ****
********************************************
********** PROCESS STATE MONITORING **********
********** Process: Tank Fill/Drain **********
********************************************
*ALERT*TANK SECURITY BREACH*ALERT*
*System Initiating 'TANK LOCK' procedure*
****** Follow 'LOCK RELEASE' procedure ******
Inside operator_input shell
***** Operator Input Required *****
1: False positive- recorded as normal baseline, resume baseline normal\n
2: Malfunction - non-malicious, corrective action complete, resume baseline normal\n
3: True Positive - malicious event, resume in failsafe mode
Action: []
```

Figure 6

```
********************************************
** RESUMING Tank Control Process Monitoring **
****              NORMAL MODE            ****
********************************************
*ALERT*TANK SECURITY BREACH*ALERT*
*System Initiating 'TANK LOCK' procedure*
****** Follow 'LOCK RELEASE' procedure ******
******** Operator Input Required ********
1: False positive- recorded as normal baseline, resume baseline normal\n
2: Malfunction - non-malicious, corrective action complete, resume baseline normal\n
3: True Positive - malicious event, resume in failsafe mode
Action: 2
********************************************
** RESUMING Tank Control Process Monitoring **
****              NORMAL MODE            ****
********************************************
```

```
[root@ts1 ply-code-modules]# ply trace-exec-syscall.ply
ply: active
( 0) ./binls
( 0) /bin/ls
( 0) ./bincat
( 0) /bin/cat
[]
                            File Edit View Search Terminal Help
                            [root@ts1 othercode]# ./binls
                            sys-usage              bincat              binls
                            exit-call              hello-world         exit-call-shell
                            [root@ts1 othercode]# ./bincat
                            root:x:0:0:root:/root:/bin/sh
                            bin:x:1:1:bin:/bin:/sbin/nologin
                            daemon:x:2:2:daemon:/sbin:/sbin/nologin
                            adm:x:3:4:adm:/var/adm:/sbin/nologin
                            lp:x:4:7:lp:/var/spool/lpd:/sbin/nologin
                            sync:x:5:0:sync:/sbin:/bin/sync
                            shutdown:x:6:0:shutdown:/sbin:/sbin/shutdown
                            halt:x:7:0:halt:/sbin:/sbin/halt
                            nobody:x:99:99:Nobody:/:/sbin/nologin
                            sshd:x:74:74:Privilege-separated SSH:/var/empty/ss
                            pcap:x:77:77::/var/arpwatch:/bin/nologin
                            messagebus:x:78:78::/tmp/run/dbus:/bin/false
                            avahi:x:79:79::/var/run/avahi-daemon:/bin/false
                            DesignPad:x:100:678::/home/DesignPad:/bin/fsshp
                            FANDA:x:101:678::/home/FANDA:/bin/fsshp
```

Figure 14

```
[root@ts1 ply-code-modules]# ply trace-exec-syscall.ply
ply: active
( 0) ./binls                                          0
( 0) /bin/ls                                           0
( 0) ./bincat                                          0
( 0) /bin/cat                                          0
( 0) /usr/bin/clear                                    0
^Cply: deactivating execs:
{ 9833 }: /bin/cat
{ 9832 }: /bin/ls
{ 9835 }: /usr/bin/clear
[root@ts1 ply-code-modules]# []
```

Figure 15

SYSTEM AND METHOD TO MONITOR PROGRAMMABLE LOGIC CONTROLLER (PLCS) IN A CYBER PHYSICAL ENVIRONMENT

CROSS-REFERENCE TO RELATED APPLICATION

This application claims the benefit of the filing date of Provisional Patent Application No. 63/477,945, filed on Dec. 30, 2022.

FIELD OF THE INVENTION

The invention relates to a system and method for monitoring at least one programmable logic controller in cyber-physical environment. In particular, the invention relates to a system providing a light-weight run-time modular tool suite for detecting system, memory, and network anomalies in Cyber-Physical Systems and Critical Infrastructure. Such a system will provide hardware and one or more modules that are capable of monitoring performance aspects of, and/or detecting anomalies in, a programmable logic controller and associated physical equipment.

BACKGROUND

Cyber-physical systems integrate physical components, such as hardware, machinery or physical objects, with software systems that monitor, direct or otherwise control one or more aspects of the hardware, or collections of hardware devices in complex systems, such as may be found, as non-limiting examples, in industries, such as manufacturing and power plants and factories, and transportation, such as airports, railroads, subways, trains, aircraft, and ocean-going vessels.

The use of a programmable logic controller (PLC) is known for controlling various processes, machinery, or equipment, and may be part of a hierarchy of systems. In a hierarchical system, there may be multiple PLCs that provide information about the monitored one or more hardware components to supervisory computers or remote terminal unit(s) (RTU(s)), each RTU may thus monitor information provided by multiple PLCs, with each PLC monitoring at least aspect of a hardware component in the cyber-physical system. The RTUs may be monitored independently, for example by a human operator assigned to each, or alternatively the RTUs may collectively be monitored by an overseeing coordinating computer, a coordinating PLC. Such a hierarchical monitoring system for a complex system may be referred to as a control system providing Supervisory Control and Data Acquisition (SCADA). SCADA is a common process control application utilized for controlling, monitoring and analyzing industrial device and processes, and provides both software and associated hardware, that collects data from sensors deployed locally and/or in remote locations and provides for communication between components, such that collected data from multiple sources may be sent to a central computer for management and control. Today, SCADA is a critical requirement for many Cyber-Physical Systems and Critical Infrastructure domains.

However, SCADA systems, may have security vulnerabilities, particularly in cyber-physical environments having multiple PLCs for interfacing with and controlling respective hardware, and often relying on remote monitoring. Additionally, SCADA system are limited in the information retained during monitoring, due to resource constraints, legacy hardware and inadequate logging of data and events. Accordingly, previously known SCADA system do not gather or retain much information relating to the lower-level monitoring of hardware components and aspects, such as memory, routing tables, and temporary file system associated with the monitored hardware components.

Thus, there is a need for a monitoring system that can provide forensic information and monitor performance information of the hardware components, and monitor performance aspects of the software, including detecting outside interference with operations, such as a cyber-intrusion. Additionally, there is a need for a monitoring system capable of capturing the volatile or temporary data that resides at the lower layers of a hierarchical system, that can capture frequently updated and overwritten information from memory, routing tables, and temporary file systems for hardware and associated PLCs. Such a system should minimize the extent to which processing performance of the cyber-physical environment is impacted.

SUMMARY

Accordingly, there is provided a forensic toolkit monitoring the cyber environment of a cyber-physical system.

In an exemplary embodiment, there is provided an anomaly monitoring system for a cyber-physical environment having at least one programmable logic controller (PLC) and a monitored component, the monitoring system having a human machine interface, a separate controller with at least a processor and associated memory, and providing a communication network for electronic communication between components of the cyber-physical environment, the anomaly monitoring system providing at least one plugin module to monitor the performance of the component and the PLC, as provided through the communication network through a PLC data collection module, the plugin comparing the data from the PLC data collection module to a model of learned behavior patterns, and thereby classify reviewed data as being normal or anomaly events.

In an exemplary embodiment, the anomaly monitoring system may have the separate controller is in the form of a computer processor, memory, and human machine interface.

In an exemplary embodiment, the anomaly monitoring system may provide the separate controller as a computer terminal, laptop, tablet, handheld computing device, computer workstation, or cloud-based processing server.

In an exemplary embodiment, the anomaly monitoring system may further include a network switch configured to direct the transmission of data from the PLC data collection module to the separate controller.

In an exemplary embodiment, the anomaly monitoring system may further provide a microcontroller configured to receive instructions from the separate controller, and capable of initiating an alarm signal.

In an exemplary embodiment of the anomaly monitoring system, the at least one plugin module may be provided as a lightweight framework, with less than 20% of the at least one plugin module being associated with the performance of the PLC, and the balance of the at least one plugin module being associated with the performance of the separate controller.

In an exemplary embodiment, the anomaly monitoring system may further include an initialization function module configured to initialize the at least one plugin module. The initialization function module may further designate the plugin module as performing a memory analysis function, or a network analysis function.

In an exemplary embodiment of the anomaly monitoring system, the initialization function module may further establish appropriate data/command and input/output channels for the anomaly monitoring system.

In an exemplary embodiment of the anomaly monitoring system, the initialization function module may further assign the at least one plugin module the role of analyzing the system performance in an online mode, or an offline mode.

In an exemplary embodiment of the anomaly monitoring system the at least one plugin module may be selected from the group consisting of: Application Monitor Plugin module; Network Payload Monitor Plugin module; Machine Learning Anomaly Detection Plugin module; SYS Call Monitor Plugin; and combinations thereof.

In an exemplary embodiment of the anomaly monitoring system, the communication network may be a wireless communication network. The wireless communication network may be selected from the group consisting of: WiFi, Bluetooth, cellular networks, and combinations thereof.

In an exemplary embodiment of the anomaly monitoring system, the transmission of data from the PLC data collection module may include one or more of aspects of the PLC selected from the group consisting of: memory utilization, cpu utilization, disk input/output (i/o) activity, disk usage, and network i/o activity, and combinations thereof.

BRIEF DESCRIPTION OF DRAWINGS

The invention is explained in greater detail below with reference to embodiments and the appended drawings of which:

FIG. 4 depicts a representative process flow chart for an exemplary plugin, provided as the APP_Monitor plugin, according to an exemplary embodiment of the invention;

FIG. 5-7 are representative screenshots of a user display associated with the monitoring system, in various stages of operation of the APP_Monitor plugin, according to an exemplary embodiment of the invention;

FIGS. 9 and 10 are representative screenshots of a user display associated with the monitoring system, in various stages of operation of the Network Payload Monitor Plugin, according to an exemplary embodiment of the invention;

FIGS. 12-15 are representative screenshots of a user display associated with the monitoring system, in various stages of operation of the Machine Learning (ML) anomaly detection plugin, according to an exemplary embodiment of the invention.

DETAILED DESCRIPTION

Figures 1, 2:
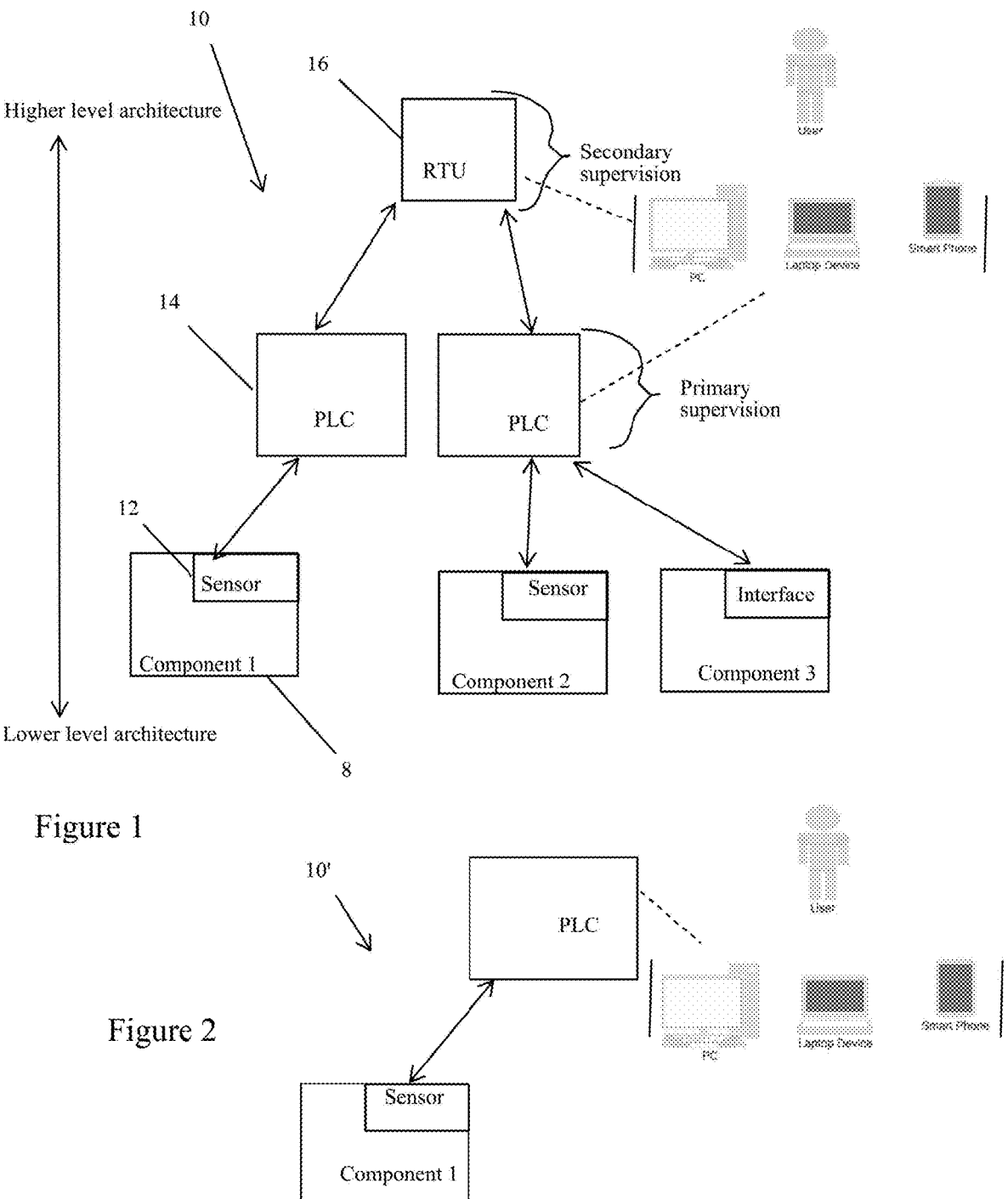
FIG. 1 is a schematic representation of a multi-level architecture for a cyber-physical system having a plurality of components, PLCs performing primary supervision, each being monitored by an RTU as secondary supervision for the complex system.
FIG. 2 is schematic representation of a simple architecture for a cyber-physical system having a single component controlled by a PLC.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Other systems, methods, features, and advantages of the invention will be or will become apparent to one with skill in the art upon examination of the following figures and detailed description.

A system and a method is provided for monitoring aspects of at least one programmable logic controller in a cyber-physical environment. The system may provide one or more software components, as well as one or more hardware components, as will be described herein, for monitoring the performance, and identify anomalous behavior, of monitored aspects in the cyber-physical environment. The system may include at least the following hardware and software components.

Hardware

In an embodiment, a representative cyber-physical environment to be monitored by the system may be in the form of a Supervisory Control and Data Acquisition (SCADA) system. Though it is contemplated that the system may be provided to monitor aspects in any nature of a cyber-physical environment.

In an exemplary embodiment, the system may monitor performance aspects of a cyber-physical system utilizing one or more PLCs, each having associated hardware components that interface with or otherwise monitor an aspect of a hardware component that is controlled by the respective PLC for associated hardware. Thus, it is contemplated that in one embodiment, and as depicted in FIG. 2, an exemplary cyber-physical environment monitored by the system may be a cyber-physical model having a single level of supervision, including a physical component being monitored and an associated PLC. In another embodiment, and with reference to FIG. 1, it is contemplated that the cyber-physical environment may be the exemplary multi-level hierarchical system architecture depicted, having both high level supervision and low-level supervision, e.g., having two or more levels of hierarchy, as commonly found in SCADA systems. Such SCADA systems may have one or more PLCs monitoring a hardware aspect at a primary level, and the one or more PLCs, in turn, being monitored as a secondary level supervision, by an RTU, which may function as another PLC, but operating at a secondary level of supervision, and monitoring performance and aspects of multiple hardware components.

In an embodiment, a small number of physical components (e.g., machinery, motors, pumps, valves, actuators) having hardware and moving parts are monitored by an external PLC. The PLC may interface directly with the hardware, and access operating information through the interface, or alternatively, the PLC may receive relevant information about the performance or other aspects of the hardware through one or more sensors that a configured to detect and transmit performance information of the hardware component to the PLC supervising the hardware component. The PLC may provide a communication terminal (e.g., network connection) through which a stream of analytical data as may be useful for anomaly detection or forensic monitoring, may be provided to a RTU.

The RTU may perform the role of a second level, supervisory PLC, having at least a processor and associated memory, and may perform various anomaly detection algorithms and operate performance detection and monitoring modules, using incoming data streams provided by one or more of monitored hardware components, associated sensors, or PLCs associated with one or more hardware components of a cyber-physical environment. Representative data flow in a multi-level hierarchical system can be seen with reference to FIG. 1, and in an exemplary embodiment of the system 10, data flow may be as follows: data streamed from at least one sensor 12 associated with, or an interface associated with, a monitored hardware component 8 of a system is directed to a PLC 14 (the primary level of supervision of the hardware component); the PLC then providing performance data to the RTU 16 (the secondary level of supervision), which may be monitored by a human operator interacting through a graphical user interface. The human operator may make performance adjustments or selections, the entry of which would be entered through the graphical user interface associated with the RTU 16. The RTU 16 would then direct commands to the PLC 14, which may adjust operation of the hardware component 8. Alternatively, adjustment to the hardware component 8 may be generated without requiring human interaction or guidance, such as the PLC 14 (or the RTU 16) determining an appropriate course of action or adjustment in the performance of the hardware component 8, such that the PLC 14 may autonomously direct an alteration in activity of the hardware component 8. For example, where the PLC 14 monitoring a component 8 detects an out-of-range value as sensed by a sensor 12, which may indicate potential harm will occur to the component 8, and the response by the monitoring system 10 may be to autonomously direct the component 8 to shut down, or otherwise alter performance, in order to prevent the anticipated or ongoing harm from occurring.

In an embodiment where the anomaly detection system 10 is deployed to monitor aspects within a SCADA system, the SCADA system may provide a way for a human operator to oversee performance aspects of the monitored components of the cyber-physical environment. The anomaly detection system may provide a separate controller 100, having at least a processor and memory, and in electronic communication with the communication network, and capable of performing calculations and algorithms as directed by the software of the anomaly detection system. For example, a human operator may monitor a display device associated with the RTU 16. The display of the RTU may depict a graphical user interface, as will be understood by those of skill in the art, through which the human operator can see relevant information, and input information or interact with the display. Thus, the SCADA system may provide a Human Machine Interface (HMI), such that a human operator may readily monitor information displayed by the Remote Terminal Unit (RTU) and interact with the information on the graphical display. In an embodiment, the interaction with the HMI may rely on a series of inputs and information entries by the user, using one or more gestures, or selections and/or data entry, using any suitable method, such as stylus, keyboard, mouse, or finger gestures (e.g., where the display is on a touch sensitive screen). The RTU 16 receives sensor 12 data streamed by one or more Programmable Logic Controllers (PLC) 14 monitoring an aspect or component 8 of a cyber-physical environment. Each of the PLC 14 and the RTU 16 may receive and send information by way of a Communication Networks, which may be a wired or wireless communication network. In an embodiment, the communication network may be a local area network (LAN) or a wide area network (WAN) using any suitable communication protocol. Where the communication network is wired, the system may utilize communication wires, such as ethernet or CAN-bus cables, for electronic communication between components. In an embodiment, the communication network is any suitable form of wireless network, including communication methods and protocols such as Wi-Fi, Z-wave, Bluetooth, LTE, or other cellular data signal, whereby components of the system through the communication network may interact with each other. It is contemplated that the communication network for the system may be a combination of wired and wireless communication. In an exemplary embodiment for example, the hardware component 8 being monitored may be monitored by any suitable sensor 12, with the PLC 14 being in wired communication with the sensor 12 or interface for the monitored hardware component 8. The PLC 14, after receiving the streamed data concerning the hardware component 8, may perform data processing, and report the hardware performance aspect information to a human monitored RTU 16, by way of wireless communications through any suitable wireless communication network.

In an exemplary embodiment of the anomaly detection system 10, there is provided a portable, lightweight, modular live forensics tool suite having at least one separate controller 100, such as a computer, that is in communication through a communication network 120 with a PLC 14 monitoring associated hardware component 8 of a complex system and configured to provide an effective cyber-protection strategy for complex systems 10, such as, for example, SCADA systems. By lightweight, it is meant that the vast majority of the code, or the processing requirements for the modular live forensic tool suite are not burdening the PLC of the monitored system, rather the separate controller would have the majority of the code loaded into memory, or the processing for the tool suite would be largely performed by the processor for the separate controller. In an embodiment, less than 20%, less than 10%, less than 5% of the code may be loaded to the PLC 14, with the balance loaded to the separate controller 100. In an embodiment, it is contemplated that less than 20%, less than 10%, less than 5% of the processing load for the forensics tool suite may be performed by the PLC 14, with the balance of the processing performed by the separate controller 100. The separate controller 100 may be provided as an add-on to an existing system 10, or alternatively, may be incorporated into the original design of the cyber-physical system to be monitored. In an embodiment, the invention facilitates run-time detection of anomalies, detectable as deviations in system performance of an aspect of a complex system, from baseline normal operations. In an exemplary embodiment, the invention performs the anomaly detection and forensic monitoring without negatively impact the operations of the cyber-physical system, such as the system performance of the system 10, 10' being monitored. This is accomplished by providing a separate controller 100, having at least a processor and associated memory and optionally interface hardware, that is in electronic communication with the monitored PLC 14 associated with the hardware component 8. The separate controller thus may receive information, optionally passing through a network switch 150, in order to perform plugin activities, including performance of algorithms utilized to monitor aspects, and assess deviations in performance of the complex system 10. In an embodiment, performance and analysis algorithms may be performed without negatively impacting upon the performance of the monitored PLC 14, and other components 8 and processing of the complex system 10. In such an embodiment, less than 20% of the plugin code or the processing requirements of the plugin module would be associated with the PLC, and the balance of the plugin code or processing requirements of the plugin module would be associated with the separate controller 100. Such a separate controller 100 may be provided in any suitable form, such as a personal computer, or may be a device such as a tablet, or handheld computing device. The separate controller 100 may communicate by wired or wireless communication methods, as will be familiar to those of skill in the art, such that the separate controller 100 may receive and send information and instructions electronically, communicating with at least one of the PLCs 14 of the system 10 being monitored. The separate controller after analysis, may provide a condition signal, which may be an alarm signal to a microcontroller 102, by optionally passing the condition signal from the separate controller 100 through the network switch 150. The microcontroller 102, upon receipt or detection of a condition signal that indicates an alert signal is required, may then send a trigger signal to indicate the status or condition detected. In an embodiment, the trigger signal may initiate a visual or audible warning, such as raising initiating an alarm 106, for example by turning on one or more of a light or strobe signal, sounding a speaker, alarm buzzer or bell, or any other method of broadcasting an alarm signal as will be familiar to those of ordinary skill in the art. In addition to, or as an alternative, the microcontroller, upon detection of the condition signal, may send out a control signal 108 directed to the PLC, which may cause the PLC 14 and the component 8 to alter performance or otherwise make compensating adjustments (e.g., slow down or stop operation, or operate in a failsafe mode), or otherwise take steps to ameliorate the cause for the anomaly condition detected by the separate controller 100.

In an embodiment, and with reference to the figures, the separate controller 100 may be electronically connected to the monitored PLC 14 of the cyber-physical system, also referred to as a complex system that is being monitored, through any suitable electronic or network connection, for example, via an ethernet connection passing through a network switch 150. The separate controller 100 may receive information from the monitored PLC and component of the cyber-physical system, optionally passing through the network switch 150 to be processed through one of the plugins of the monitoring system, whether online or offline. Performing the analysis on a separate controller 100 allows the analysis to be performed without significantly impacting or degrading the overall performance of the monitored PLC 14. In an exemplary embodiment, the system provides only minimal software programming code that is required to operate on the monitored PLC 14, and may capture readily discernible information such as network traffic, and memory and computer statistics for that PLC. Such captured information from the PLC 14, identified in FIG. 16 as a packet of information or PLC data collection, may be gathered without significant processing time in the monitored PLC 14 being occupied for the data collection, and provided through suitable electronic communication methods, such as via network connection, and optionally through a network switch 150, for further analysis by the separate controller 100.

The separate controller 100 may receive information from the PLC 14, as collected by the PLC data collection module 400 which may be in the form of a database, or rewriteable memory associated with the PLC, and passed through the network switch 150.

The separate controller 100 may load and/or run various plugin modules in order to monitor and analyze performance of the cyber-physical system being monitored. The plugin modules may operate in an online mode 420, where collected information, provided as new samples 422, that are compared to models 424 of normal behavior patterns. In an online mode, the performance of the plugin, and assessment of normal or deviations may be performed without interrupting network communications and the performance of the monitored complex system. The normal behavior models may be learned by training the system with normal behavior run time that is recorded and analyzed for patterns indicative of normal behavior. Alternatively, the models may be predictive, or learned from other sources, and provided as models that can be compared to the samples 422 for the purpose of identify and classifying operating samples 422 as being normal or anomalous behavior.

Additionally, or alternatively, the separate controller 100 may be operated in an offline mode 430, characterized by the separate controller not being engaged in communications through the network switch with the PLC 14 for the complex system. In an offline mode, historical data 432, which may be the same as the samples 422 discussed previously, only know recorded in memory for future access and analysis, may by analyzed for feature extraction 434, where characteristic features or signal patterns in the reviewed performance data from the PLC 14 indicate that a behavior is indicating an anomaly event, or normal behavior. Periodically, the models may be uploaded to storage database or memory component, with such model behavior being classified as normal, or anomaly events, whether by machine learning, or by human review and interaction and thereby directing the classification of the historical data being reviewed and used to train models within the monitoring system, thus periodically training models 436 for the monitoring system.

Software

In an exemplary embodiment, the system is suitable for monitoring and gathering forensic information on hardware components 8 of a system 10, 10', such as a SCADA system. Such forensic information may be a vital part of the protection strategy. However, previously known strategies for monitoring and forensic analysis of SCADA systems created challenges, mainly due to resource constraints, legacy hardware, and inadequate logging of data and events. In an exemplary embodiment, there is provided a system and method for capturing the volatile data that reside at the lower layers of the architecture—memory, routing tables, and temporary file systems to name a few, without significantly burdening the operation of the monitored complex system, such as the SCADA system that is being monitored.

Figure 3:
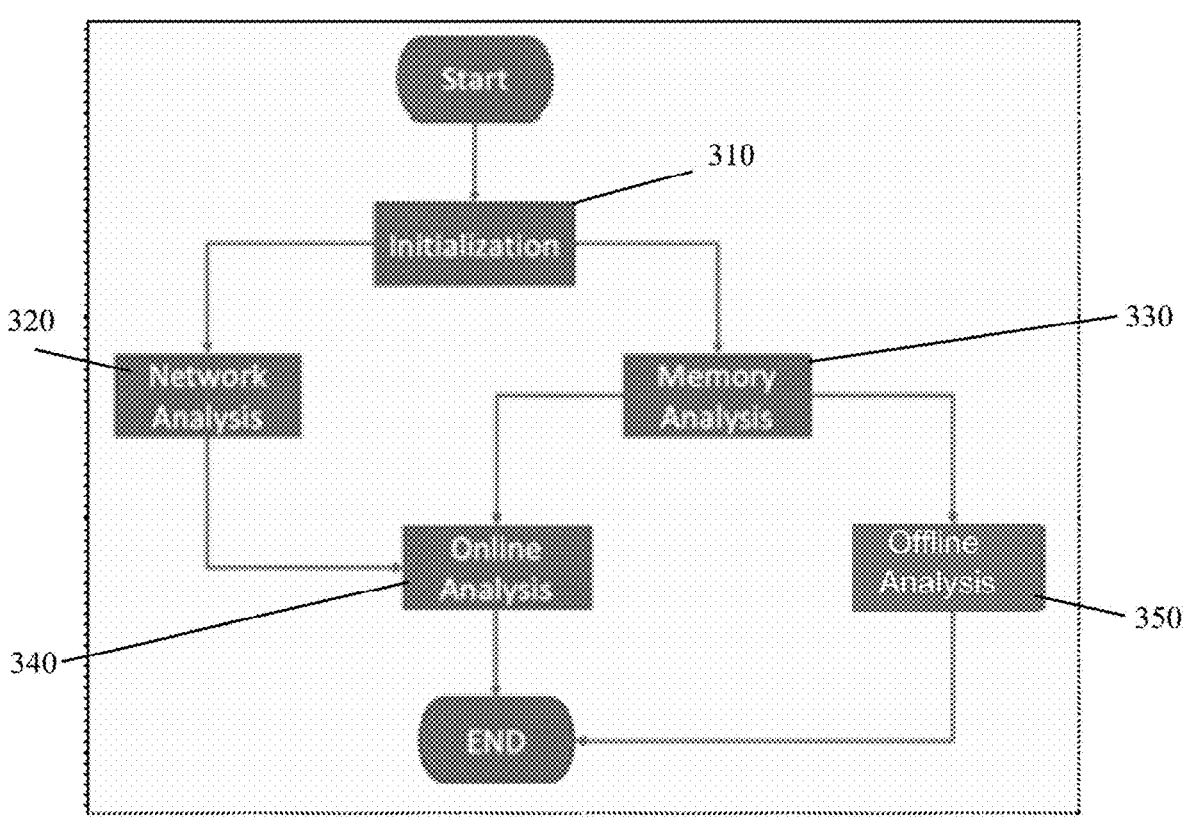
FIG. 3 is a depiction of the framework of top-level functional modules.

In an exemplary embodiment, and with reference to FIG. 3, the invention strategically combines multiple detection methods as plug-in modules operated by the separate controller 100, e.g., through analysis of incoming data streams from the PLC 14 and monitored components 8, and may be compared with reference to known, or learned normal behavior models. The plug-in modules may be in the form of software operating through the processor for the separate controller 100. The plug-in modules are comprised of both online analysis modules 340 and offline analysis modules 350 and may include plugin modules, or alternatively described as software libraries, that may be provided for various analysis functions, such as system tracing, network tracing, security tracing, memory dump extraction and forensics analysis, and application monitoring. The plugin modules may be configured to be loaded and be processed by the processor of any of: 1) the PLC 14 associated with the component 8 being monitored; 2) the separate controller 100, after adjusting the code of the PLC to expose relevant information that would ordinarily not be visible, such as by providing permission for the separate controller 100 to access to lower level data of the PLC that is normally hidden; or 3) a cloud processing server having a processor, and in wireless communication with the PLC 14 of the system being monitored, after similarly altering the permissions of the PLC, as discussed immediately above.

Integration of the cyber-physical monitoring system in existing cyber physical systems and Critical Infrastructure, such as those found in, as non-limiting examples, industry, transportation, and machinery controls, will help alleviate future cyber-threat incidents with the monitored cyber-physical systems. For example, general descriptive application of the monitoring system will be presented in an exemplary application as shipboard machinery controls, though it is contemplated that the teachings herein may be adapted for any nature of cyber physical system, such as SCADA systems, or simpler PLC/component arrangements. The cyber-physical monitoring system achieves a robust cyber-protection strategy by considering the overall system performance baseline, reflected in system usage and activities, and network usage and activities.

Furthermore, select cyber-physical monitoring system modules are designed with response capabilities for specific types of attacks; such as attacks that create a connection backdoor and attacks injecting network packets with malicious payloads. The response capability can be extended to other modules and for a broader range of attacks.

In a high-level summary of operations of the cyber-physical monitoring system of the present invention, the monitoring system can be automatically started, for example, by a command from the PLC 14 upon overall power up of the monitored component(s) 8. In an embodiment, the monitoring system may operate, for example, from the start of operations, and continue for the duration of operations until terminated. In an embodiment, with the monitoring system providing multiple plugin modules as a lightweight framework, it is contemplated that a user may trigger, or initiate a command to the monitoring system to load, and start monitoring operations of one or more plugin modules, for each of the separate plugin modules running software process(es).

In an exemplary embodiment, and with reference to FIG. 3, the cyber-physical monitoring system may provide an Initialization Function module 310, that performs the initialization of the plugin currently loaded, such as the underlying program's applicable internal variables. Through the Initialization Function module, the initialization function of the monitoring system is performed makes a determination as to whether a plugin module to be initiated is to monitor the interface and data from the PLC 14 and network communications of the monitored system, in order to perform a network analysis function through a network analysis module 320 and thereby identify anomalies or recognize normal run performance. Alternatively, the plugin module is to be designated through the initialization function if it is to be assigned a task of monitoring memory status and perform a memory analysis function of the PLC 14, through a memory analysis module 330. Additionally, the initialization function may establish appropriate data/command and input/output channels.

Upon completion of the Initialization Function of the initialization function module 310, the plugin will perform the necessary data collection, processing and analysis with the information received through the electronic communication, or as gathered from the PLC 14. In an embodiment, where the plugin is assigned as a network analysis plugin, then network related information is collected by the plugin, processed accordingly, and results are output to a terminal and/or saved to a file for further/later analysis. Alternatively, in an embodiment where the plugin is assigned as a memory analysis plugin, then memory related information is collected by the plugin, processed accordingly, and results are output to a terminal and/or saved to a file for further/later analysis. It is contemplated that the memory analysis may be performed in real time, as an online analysis module 340, performed while the monitoring system is online and actively monitoring aspects of a cyber-physical system; alternatively, it is contemplated that the data monitored from the PLC for the memory analysis may be temporarily stored to memory associated with the separate controller 100, or an accessible database in electronic communication with the processor of the separate controller, such that memory analysis may be performed offline, as an offline analysis module 350, by reviewing the run-time collected data after operations have stopped, or would not interfere with operations of the cyber-physical system, such as during a lull or halt in task activities of the cyber-physical system being monitored, or reviewed through a user accessible terminal, independent of the operations of the cyber-physical system being monitored. The offline analysis differs from the online analysis in that the offline analysis is reviewing stored data and the review is delayed, when compared to the performance of online memory analysis.

Figures 4, 5:
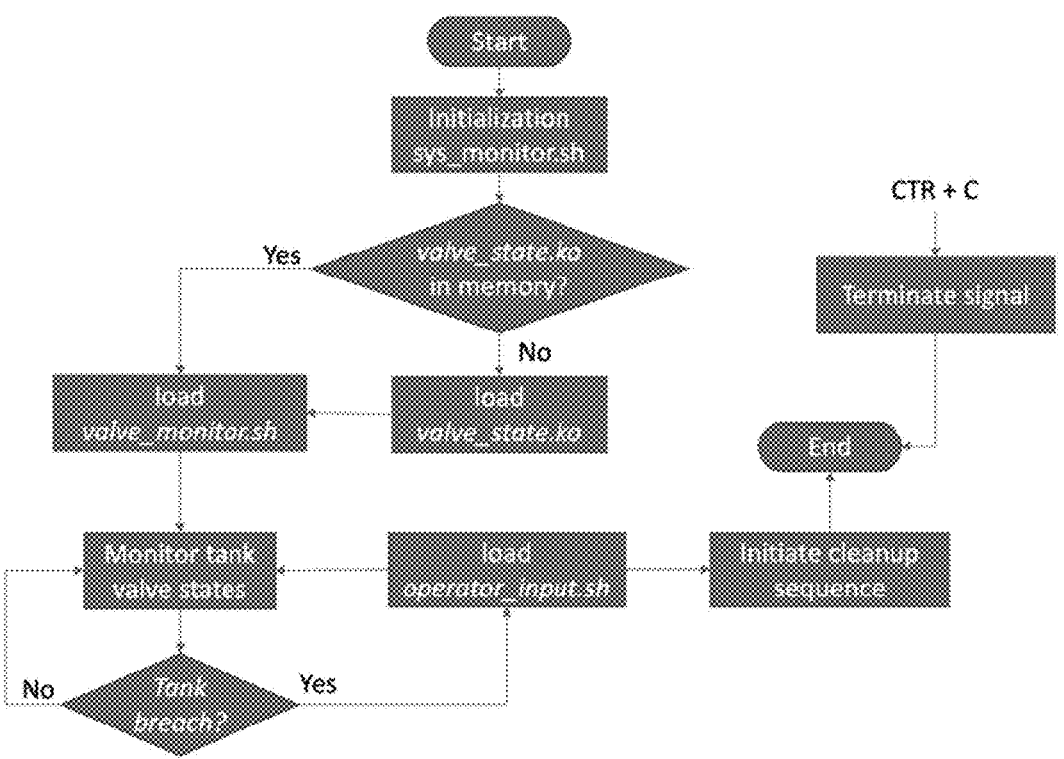

In an embodiment, it is contemplated that the performance of a plugin, whether as a memory or network analysis plug in, may be run in a loop, and configured to receive a command from a user that can initiate performance of the plugin, beginning the looped task depicted in FIG. 4 or alternatively a user command may interrupt the looped task of the plugin, such that the user can determine the start/stop of the plugin as required. In another embodiment, at least one plugin may be designed to be run for a specific amount of time, or till a certain criterion is met in the input data.

As shown in an exemplary application of the cyber-physical monitoring system, as depicted in the process flow diagram of FIG. 4, the process flow for an exemplary plugin is depicted, and exemplary screen shots of the user interface display depicted in FIGS. 5-7, where the monitoring system may be, in an exemplary application, monitoring a PLC 14 associated with a component 8. The exemplary screen shot depicted in FIG. 5 corresponds to the monitoring display after initialization function has been performed. FIG. 6 corresponds to the monitoring display when a breach in tank state is detected. FIG. 7 corresponds to the monitoring display when monitoring plug in is in regular operations. In this example, the monitoring system is monitoring a component that is a tank valve associated with a tank that may undergo a tank drain or a tank fill process, such that the tank may be filled or drained in the course of regular operations of the complex system. The operation may be monitored, in order to quickly and properly react to anomalous conditions, such as where the tank, or associated valve, may suffer a breach, or for example, where there is a malfunction in the complex system. With the monitoring process being started, and with reference to FIG. 4, the initialization function module 310 will perform the initialization function, as described previously. The system will then check to see if the plugin has the current status of a monitored tank valve in memory, as determined by a kernel object file, loaded into the PLC 14. The kernel object file is a lightweight file or code that can be incorporated into the processing of the PLC, without impacting the performance of the processor for the PLC. In this case, another lightweight code (valve-state.ko) will instruct the processor for the PLC to provide the status of the monitored valve. If the current status of the tank valve is not already stored in memory of the separate controller 100, the valve state will be loaded, and the processing will then load a lightweight program capable of monitoring the condition of the tank valve (valve_monitor.sh). Alternatively, if the state of the valve is already stored in memory of the separate controller 100, then the processing will then load a lightweight program capable of monitoring the condition of the tank valve (valve_monitor.sh).

The monitoring then will operate in a loop routine, where the tank valve states are being monitored and the loop requires a repeatably performed determination of whether a tank breach has occurred. If no tank breach is detected, the process will loop back to monitoring the tank valve states. If a tank breach is detected, another lightweight program is loaded (operator_input.sh), which will look for input from an operator for instructions how to proceed. The operator may instruct the monitoring plug in to continue to monitor the tank valve states, or may alternatively initiate a cleanup sequence. The processing may be interrupted by the user providing a termination signal, such a through a user input that is a termination command. If a tank security breach is detected, the system may initially respond by initiating a tank lock procedure and await the user entry as a command for how to proceed. The user input may be in the form of a user provided command or selection, as an entered text string or selection that indicates, for example, a false positive, a malfunction, or a true positive, in characterize the detected tank security breach. In a false positive, the monitored performance may be recorded as normal baseline operations of the system, and monitoring may resume as normal course of events. If the user entry is a malfunction, the event will be noted as non-malicious, and after or through corrective action, normal baseline operations may resume. If the user entry is a true positive, the event will be noted as problematic, or malicious event, and the system may resume operations in a failsafe mode, in order to minimize damage or effects of the true positive event. At any point, the user may enter a command, such as "control+C" to stop the monitoring process. The process depicted in FIG. 4, and the exemplary screenshots of the user display interface in FIGS. 5-7 may be associated with the performance of an Application Monitor plugin (APP_Monitor plugin), that monitors the status and looks for user intervention where required if an anomaly event is detected.

In an embodiment, the cyber-physical monitoring system provides one or more plugins that are capable of being automatically terminated by the process controller at the end of the operations, such as completion of a task, duty cycle, mission or as signaled by a user command.

The exemplary Application Monitor plugin is just one of the plugins that may be provided for monitoring aspects of a cyber-physical system, which may be, for example, a SCADA system.

The incorporation and utilization of various plug in modules will be discussed below.

Application Monitor (APP_Monitor) Plugin

APP_Monitor plugin has been described above with reference to FIGS. 4-7, but in brief, the plugin serves to monitor the state of a Tank Fill/Drain control process. If the process transitions to an insecure state, as determined by the state of the two valves, then the operator is alerted of the potential beach and the tank is locked down. At this point the plugin prompts the operator to input response action and will execute it accordingly.

The APP_Monitor plugin can run constantly or be loaded by the operator as needed and then unloaded. This ability to execute the plugin on demand by loading and unloading helps keep its impact on system resources to a minimum.

The APP_Monitor plugin can be terminated gracefully with operator input or by sending a kill signal with a user directed command, for example, by entering "CTRL+C" through the user interface.

Network Payload Monitor Plugin

The Network Payload Monitor plugin monitors layer-5 (application layer) of the network stack. The process flow of the Network Payload Monitor plugin can be seen with reference to FIGS. 8 and 16. The purpose of this plugin is to detect patterns of interest that are inside the application layer payload. As with the Application Monitor Plugin, the Network Payload Monitor Plugin is a lightweight code in any suitable language convention, for example, Python, that can be loaded and run on the PLC 14 without significant impact upon the processing performance needed to control the performance of the component 8. This Network Payload Monitor Plugin module analyzes network activity for the cyber-physical system being monitored. In an embodiment, the Network Payload Monitor Plugin is initialized through the initialization function of the Initialization Function Module 310, as previously described. The initialization function may assign a plugin the task of performing Network Analysis, which may be performed in an online mode. The Network Payload Monitor Plugin may be capable of detecting one or more attack patterns in the incoming network traffic. The attack patterns may be recognized from feature extraction 434, and may be provided in models 436 of network activity that may be used to train the monitoring system. Such models may be operator specified, or alternatively pre-loaded into the system, for comparison to one or both of the sample data 422 or historical data 432. Multiple patterns can be specified for detection, such as '/bin//sh', '/etc/passwd', '0x2f62696e2f7368' and so on. It is further contemplated that patterns of interest for the models may be input in ASCII or Hexadecimal for further comparison to characteristic behavior patterns.

Figure 8:
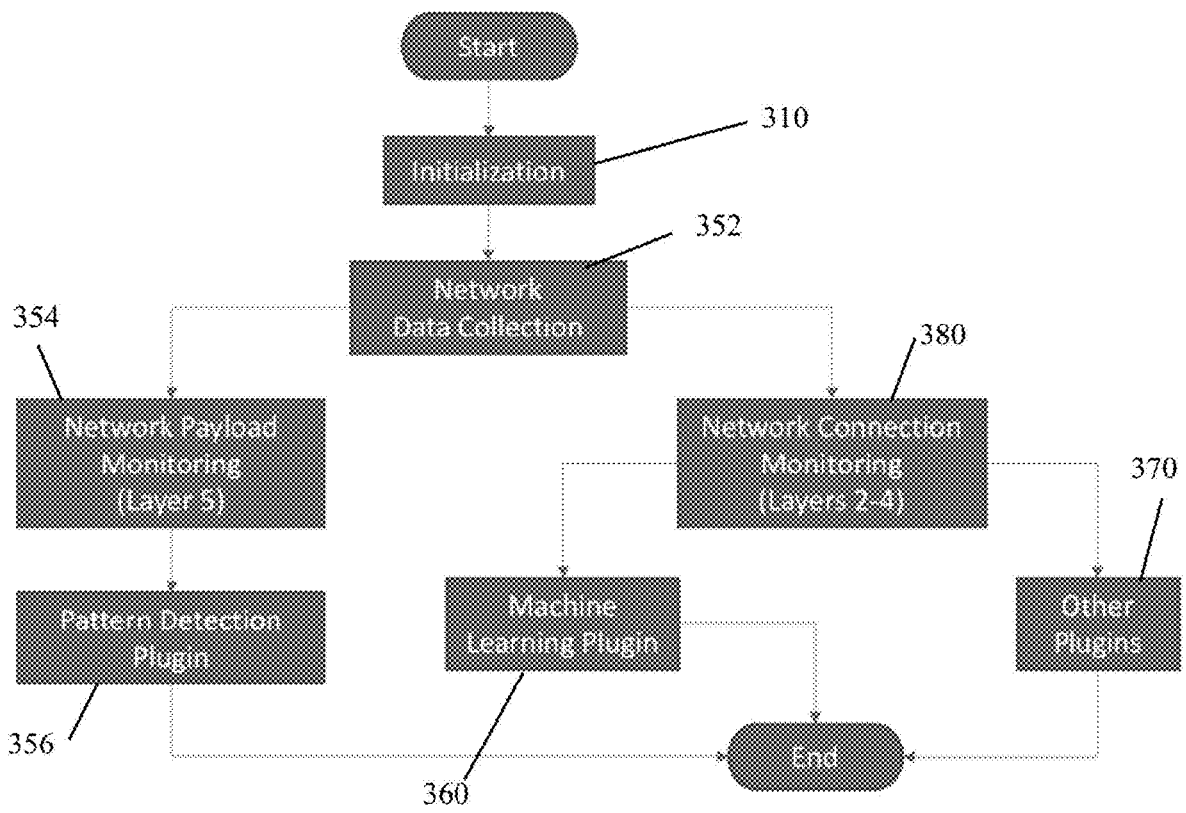
FIG. 8 depicts a representative process flow chart for an exemplary plugin, provided as the Network Payload Monitor Plugin, according to an exemplary embodiment of the invention.
Figure 16:
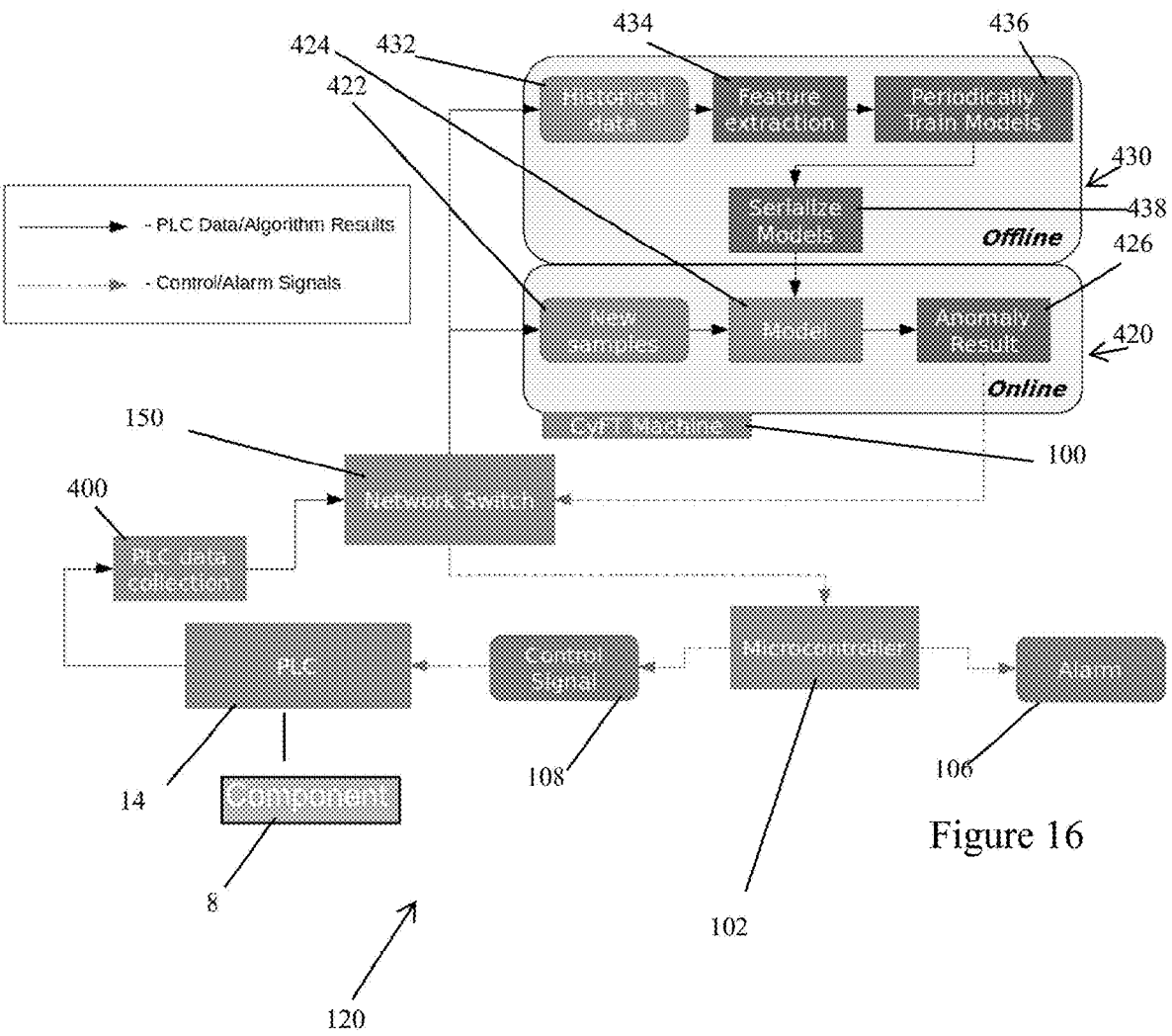
FIG. 16 depicts a representative process flow map according to an exemplary embodiment of the invention.

With reference to FIGS. 8 and 16, the Network Data Collection module 352 may gather the relevant data from the monitored PLC 14, and temporarily stored in the PLC Data Collection module 400, for transmission through the network switch 150, for review and analysis by the separate controller 100. The Network Payload Monitoring module 354 then monitors incoming performance data, with an assessment of normal or anomalous behavior being performed by a Pattern Detection plugin module 356, whereby characteristic behavior patterns may be recognized by comparison to models having either normal or known anomaly behavior. The Network Connection monitoring may alternatively occur in layers 2-4 of the Network Stack, with the Network Connection Monitoring module 380 accessing the monitored PLC 14 data, such as from the PLC Data Collection Module 400, and again compared to known patterns from a Machine Learning plugin module 360. It is contemplated that additional plugins modules 370 may be loaded, and run concurrently, or as alternative programs within the system for monitoring aspects of the cyber-physical system.

Figures 9, 10:
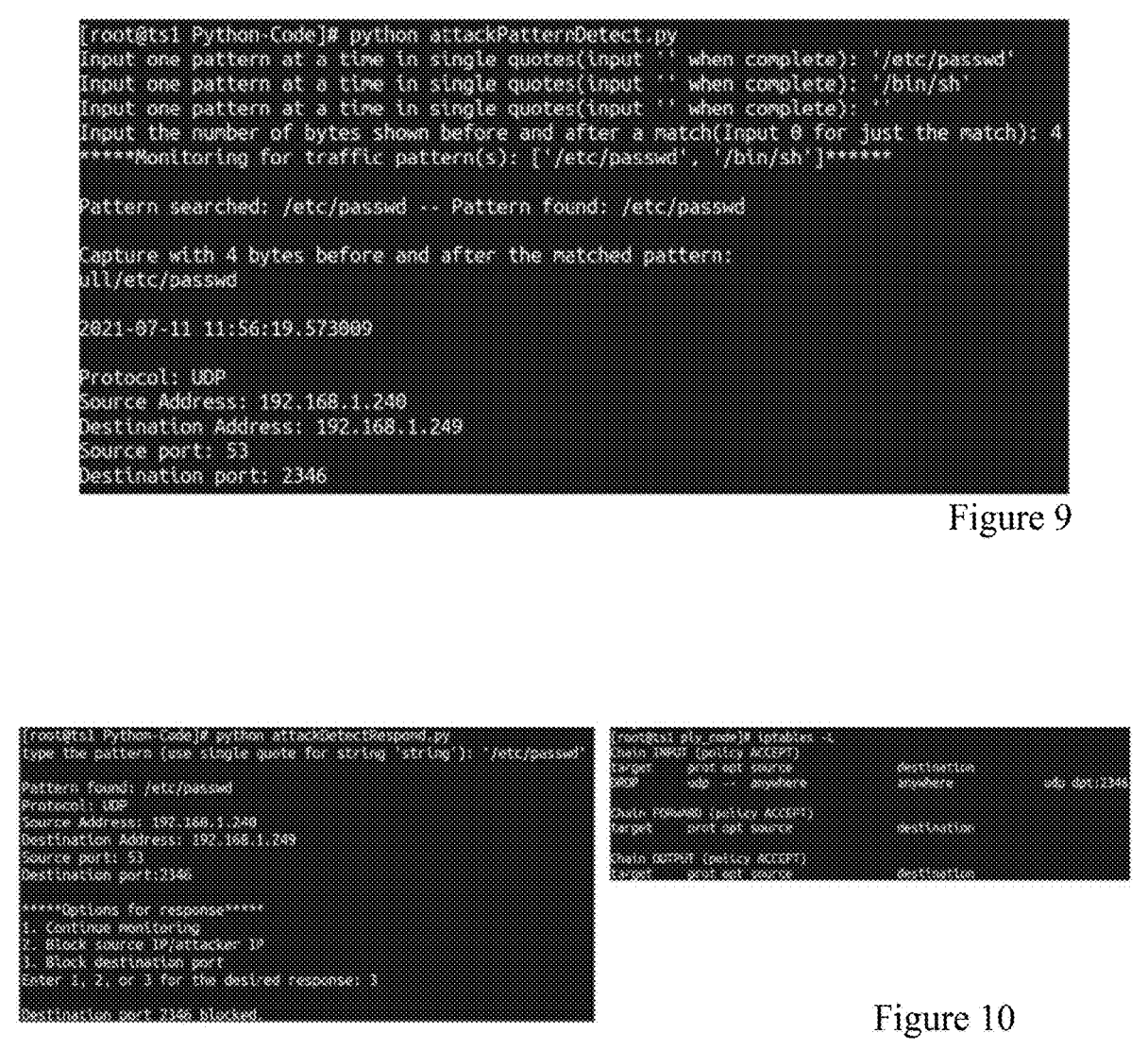

As shown in an exemplary application of the cyber-physical monitoring system, and as depicted in the process flow diagram of FIGS. 8 and 16, the process flow for an exemplary plugin is depicted, and exemplary screen shots of the user interface display depicted in FIGS. 9 and 10, where the monitoring system may be, in an exemplary application, monitoring a PLC 14 associated with a component 8. In operation of the monitoring plugin modules, such as the network payload monitor plugin module 354, when a specified pattern is detected in the incoming data being reviewed, for example, the network traffic data from the PLC data collection module 400, the plugin will perform the comparison to learned patterns, and recognize normal or anomaly events, whereupon the system may initiate an alert response to the operator/user. In an exemplary embodiment, the operator/user also has the option of adjusting the size of the data files being compared, for recognition of anomaly or normal run-time behavior patterns, as the user may specify the number of bytes to be captured and displayed on the dashboard displayed on the user image display device, (which could be a simple terminal window or a more complex GUI) for more contextual relevance for analysis. Thus, as depicted in FIG. 8, the Network Payload Monitor Plugin may follow a process where after initialization by the initialization function module 310, the network data is collected by the Network Data Collection module 352 and may be temporarily stored to memory. For Layer 5 monitoring, the Network Payload Monitoring module 354 will send the network information to be compared to the Pattern Detection Plugin module 356, where the characteristic patterns would be evaluated and recognized, and if necessary, performance feedback may then be provided to the user. Alternatively, the data from the Network Data Collection Module 352 may be captured for monitoring Layers 2-4 through the Network Connection Monitoring module 380, where one or more plugins may be run to review the collected data, such as by reviewing the data in light of the learned behaviors recognized in the Machine Learning Plugin module 360, or any other relevant plugin module 370.

With reference to FIGS. 9 and 10, there are depicted exemplary screen shots that correspond to the monitoring display after initialization function has been performed, and a network analysis function assigned for the plugin to operate. As shown, various patterns from the pattern detection plugin module 356 may be entered sequentially for comparison to the collected data from the Network Data Collection module 352. Additionally, the user is able to set a conditional size for comparison in the plugin, where the user may select an entry of '0' for comparing only the data that is a match to the learned behavior pattern or may expand to additionally include relevant data adjacent to, and occurring sequentially before, or after the matched data. In such an instance, the user may select the number of bytes of data in the data stream before and after the match pattern recognized, which may provide valuable context for why the matched pattern incident is detected.

With reference to FIG. 10, if there is a match in the sensed data after comparison to learned behavior patterns, the system may provide an opportunity for the user to direct the system response. For example, the user may instruct the system, by entering a text string, or otherwise inputting a selection, to continue monitoring, to block the source IP address, or to block the destination port. For example, selection of 'continue monitoring' would have the system continue as previously engaged, for example, where the user recognizes that the detected network anomaly event is not indicative of a problem. Alternatively, where the selection is made to 'block source IP/attacker IP' that would be appropriate where the user confirms that the network intrusion or anomaly that is detected is not anticipated or desirable and may likely be associated with a malicious or harmful anomaly event, as presumably this source IP address would be the attacker's IP address where there is a network intrusion or hack occurring. Alternatively, the user may direct the system to 'block the destination port' thereby limiting the ability of the intruding IP address to further penetrate into the communication network.

ML Based Anomaly Detection

The Machine Learning (ML) anomaly detection plugin module utilizes an algorithm running a comprehensive anomaly detection model, that bases its detection of anomalies occurring within the complex system, or a component of a complex system, by analyzing the overall system state. To this end the ML anomaly detection model utilizes one or more sources of data in order to recognize if the complex system (e.g., a SCADA system) is in an anomalous state. In an exemplary embodiment, the code for the ML anomaly detection plugin module may run directly on the monitored PLC 14, or may be run on the separate controller 100, accessing the data stream through communication network, as discussed herein. The sources of information from the complex system may include monitoring a data stream from a PLC 14 associated with a component 8, including any one or more of memory utilization, cpu utilization, disk input/output (i/o) activity, disk usage, and network i/o activity. Such a comprehensive view of the overall system state makes the detection extremely robust. Furthermore, as can be seen with reference to FIG. 11, the anomaly detection plugin module utilizes an anomaly detection model that may feature a closed-loop architecture, when deployed on the PLC 14 with operator-in-the-loop. This enables any newly encountered scenarios that could potentially be considered to be anomaly events, but are later cleared by the reviewer(s) of the data streams, such as a security review team, to confirm the data stream represents an unusual, but likely normal baseline operation, and thus can be fed to the ML model, where the library of models may refine the ability of the anomaly detection system 10 to detect normal behavior, and distinguish from deviations or anomaly events. Such incremental reinforcement of the model's detection sensitivity may reduce the occurrence of false positives, and thereby provides a benefit in minimizing operator fatigue, as the ML model is able to discern anomaly events more accurately with improved learning of an expanded library of normal behavior patterns.

Figure 11:
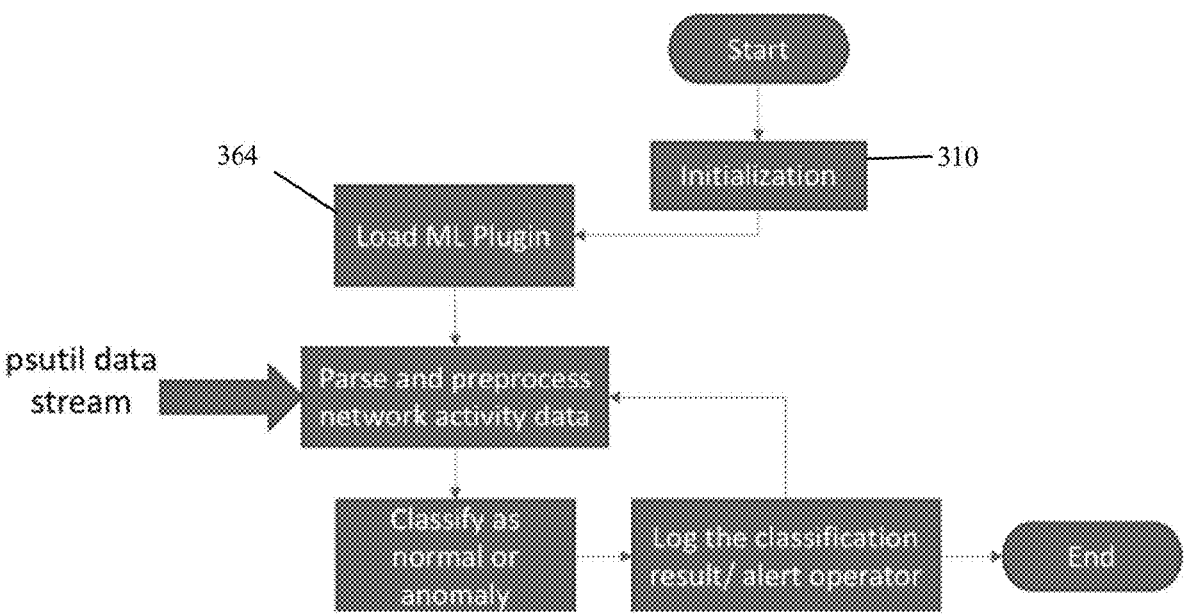
FIG. 11 depicts a representative process flow chart for an exemplary plugin, provided as the Machine Learning (ML) anomaly detection plugin, according to an exemplary embodiment of the invention.

As depicted in FIGS. 11 and 16, upon starting the monitoring of a complex system, the anomaly detection system 10 would initially bring up operation of the ML based anomaly detection plugin module upon the plugin being initialized through the initialization function of the Initialization Function Module 310, as has been previously described. The ML anomaly detection plugin module would then be loaded for operation in monitoring the data stream from the PLC data collection module 400, which, in an exemplary embodiment, the combined data streams from multiple aspects may be presented as the psutil data stream, that is presented to the separate controller 100 for the anomaly detection system 10.

With reference to the exemplary process flow diagram of FIG. 11, for the Machine Learning (ML) anomaly detection plugin module, the incoming data stream may be parsed for analysis, and a preprocess routine may be applied to the incoming network activity data. The parsed and processed data stream may then be assessed through an algorithm of the ML anomaly detection plugin module to classify the reviewed data stream as being normal or anomalous behavior, and the result may be logged to a database, or memory associated with the processor for the separate controller 100. If continued monitoring is ongoing, the process flow would then return to access the subsequent and current data stream (psutil data stream) information provided from the PLC data collection module 400, and the process repeated in a continuous loop. If the assessment of the algorithm for the ML anomaly detection module classifies the reviewed data stream as being indicative of an anomaly event, the result is logged, and an alert may be provided to the operator, as discussed previously. The operator may optionally interrupt the process loop, by entering a command, such as "control+C" to send an instruction to the plugin module to cease monitoring activities, as has been discussed previously.

Figures 12, 13:
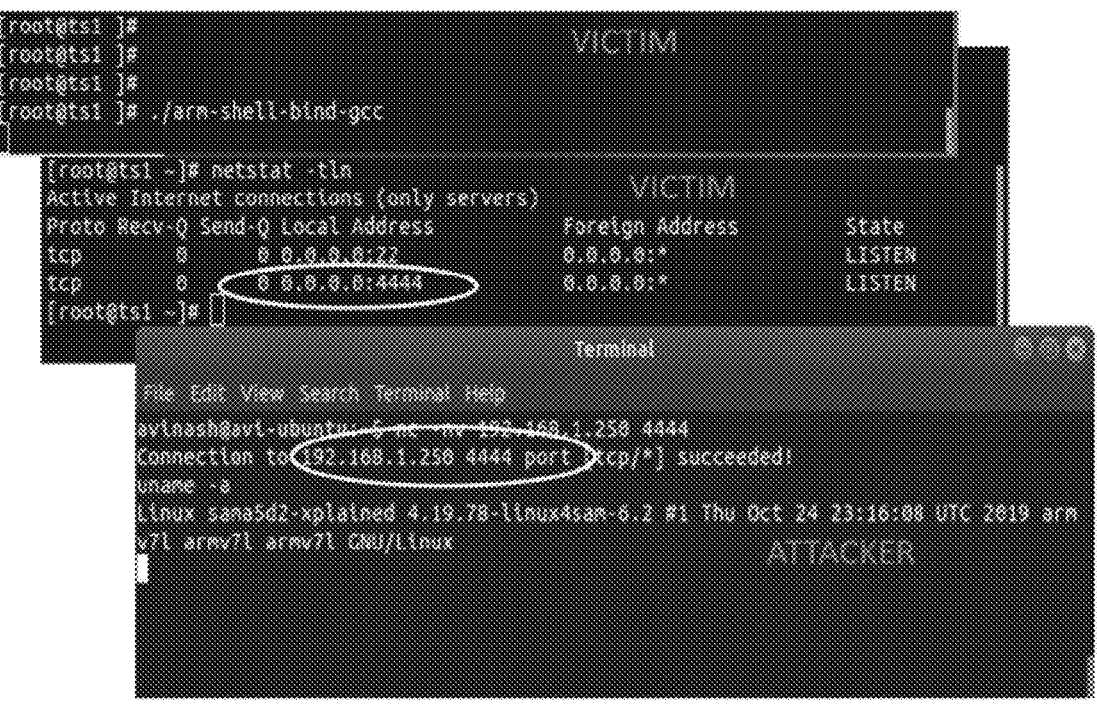

FIG. 12 depicts exemplary screen shots of the user interface display, where the ML anomaly detection module is monitoring aspects of the PLC 14 to detect and classify a monitored data stream as being normal or anomaly event. As shown, the data stream, once parsed and processed for the network activity data may determine if the activity indicates an intrusion into the communications network for the monitored complex system, such as where an attacker is identified, as accessing the communication network through a connection that is not originating within the communication network as originally created, rather, an outside connection is detected, comparing the connection port information. In such an embodiment, the system may detect a malicious listening port (backdoor) at runtime.

SYS Call Monitor Plugin

In an exemplary embodiment, there is provided a SYS Call Monitor Plugin that can be loaded within the anomaly detection system 10, 10'. The SYS Call Monitor Plugin operates to monitor and log exploits for one or more of the PLC 14, and/or the human machine interface through which the user is able to interact with the component 8 or the PLC 14 associated with the component 8.

The SYS Call Monitor Plugin operates an algorithm to determine anomaly or normal behavior of the monitored system, using an assembly coding approach and tested using a C language wrapper function. Some of the exploits tested and monitored through the plugin include spawning shell, directory listing, and reading password file, discussed with reference to FIGS. 13-15, depicting exemplary screen shots of the user interface display, where the SYS Call Monitor Plugin is operating to identify and classify behavior as normal or anomaly events.

In an embodiment, the algorithm developed operates utilizing ply [1] (eBPF) code that can run on the PLC 14 and detect when the exploit code executes. With reference to FIG. 13, the algorithm Ply may detect the call to "/bin/ls"; and with reference to FIG. 14, the output of the analysis by the algorithm may include, for example, calls made by the exploit codes seen in FIG. 13, and as shown, the algorithm Ply may detect the call to "/bin/cat". Furthermore, with reference to FIG. 15, the algorithm PLY output may provide a summary for tracing execution of new processes.

The system may utilize any convention for language programming, such as eBPFs, as will be familiar to those of skill in the art. eBPFs provide a powerful way of extending the capabilities of the Kernel without the need for changing the kernel source code or load kernel modules. System observability and security are best implemented in the operating system due to the kernel's privilege to control the entire system. eBPFs run user code within the kernel space in a sandboxed environment with robust OS safety and stability. They are very powerful for extracting fine-grained security observability data with very low overhead. eBPFs also enable developers to trace applications as well as enforce preventive runtime application security. eBPF programs can be attached to trace points as well as probe points allowing exceptional visibility into the runtime behavior of applications and the system itself.

For instance, an eBPF module that is specifically deployed to trace system calls (syscall) acts as a gatekeeper and alerts user whenever a syscall of interest is made. It alerts the operator of the application/process that made the syscall which is very powerful feedback using which the operator can further examine the process and its memory space and kill the process quickly if need be.

SUMMARY OF BENEFITS

Utilizing some or all of the teachings herein, the anomaly detection system 10 when deployed for monitoring one or more aspects of the complex system 10, 10', for example, a SCADA system, may provide some or all of the following benefits:

Both large and small systems can be built or adapted to using the anomaly detection system as described herein;

Cyber-physical systems with which the teachings herein may be applied may vary widely in complexity, and may have a wide range of control loops, such as by having a small number of control loops, e.g., less than 50 control loops, or may have a large number of control loops, for example, exceeding thousands of control loops, depending on the application. Example processes include other machine type control systems, industrial, infrastructure, and facility-based processes, as described below;

Industrial processes applicable for use with the teachings herein may include manufacturing, and process control, may run in continuous, batch, repetitive, or discrete modes;

The monitoring systems taught herein may be beneficially incorporated or used alongside with PLCs and other machinery control systems;

The teachings herein may be beneficially applied with suitable automation control systems and/or hardware; and The teachings herein may be employed with a wide variety of complex cyber-physical systems, and accommodate and may be integrated with a wide range of equipment and complex system manufacturers;

The various embodiments of the anomaly detection system taught herein provide significant cost savings by minimizing operational downtime of mission critical systems in the aftermath of any cybersecurity incident;

Integrating an embodiment of the anomaly detection system in existing machinery controls may be beneficially deployed to detect and/or alleviate future cyber-threat incidents;

The monitoring systems taught herein are believed to be the only known solution to explore/implement eBPF for network and security monitoring on PLCs 14 utilized in cyber-physical system;

The monitoring systems taught herein are believed to be the only known solution (utilizing opensource tools) to extract PLC memory dump and analyze the data from the PLC memory;

The monitoring systems taught herein provides a light-weight solution—with easy portability across any variety of suitable vendor solutions, as long as the required dependencies are provisioned;

The monitoring systems taught herein are believed to provide an eBPF solution that allows the anomaly detection system to operate and ensure that the lightweight operation will not crash the cyber-physical system being monitored, nor introduce other bugs into the pre-existing complex system;

In an embodiment, the anomaly detection systems taught herein may utilize a combination of kernel modules and eBPFs as plugins for detection and when appropriate may generate a relevant response to the anomaly event detected; and The monitoring systems taught herein provide flexibility and ease of writing network and security monitoring eBPF code that can operate in concert with the existing processing of the cyber-physical system being monitored.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An anomaly monitoring system for a cyber-physical environment having at least one programmable logic controller and a monitored component, the anomaly monitoring system having a human machine interface, a separate controller with at least a processor and associated memory, and providing a communication network for electronic communication between components of the cyber-physical environment, the anomaly monitoring system providing at least one plugin module to monitor the performance of the monitored component and the PLC, as provided through the communication network through a PLC data collection module, the plugin module having a processor, memory, and instructions stored in the memory and executed by the processor, the plug in module comparing the data from the PLC data collection module to a model of learned behavior patterns, and thereby classify reviewed data as being normal or anomaly events; and further comprising a network switch configured to direct the transmission of data from the PLC data collection module to the separate controller; wherein the at least one plugin module is provided as a lightweight framework, with less than 20% of the at least one plugin module being associated with the performance of the PLC, and the balance of the at least one plugin module being associated with the performance of the separate controller.

2. The anomaly monitoring system of claim 1, wherein the separate controller further provides a human machine interface.

3. The anomaly monitoring system of claim 2, wherein the separate controller is a computer terminal, laptop, tablet, handheld computing device, computer workstation, or cloud-based processing server.

4. The anomaly monitoring system of claim 1 further comprising a microcontroller configured to receive instructions from the separate controller, and capable of initiating an alarm signal.

5. The anomaly monitoring system of claim 1, further comprising an initialization function module, wherein the instructions stored in memory, when executed by the processor cause the processor to initialize the at least one plugin module by registering the at least one plugin module within the cyber-physical environment, and selecting internal variables for the at least one plugin module, and establish input and output channels for operation of the anomaly monitoring system.

6. The anomaly monitoring system of claim 5, wherein the instructions, when executed by the processor, further cause the processor to designate the at least one plugin module an analysis mode function selected from the group consisting of performing a memory analysis function, or performing a network analysis function, based on the selection from the internal variables, that specify the at least one plugin's functional type.

7. The anomaly monitoring system of claim 6, wherein the instructions, when executed by the processor cause the processor to establish data and command communication channels between the at least one plugin module and the anomaly monitoring system, and to configure input and output channels to enable the exchange of analysis results and control signals between the at least one plugin module and a remote terminal unit.

8. The anomaly monitoring system of claim 7, wherein the instructions, when executed by the processor cause the processor to assign the at least one plugin module the role of analyzing the system performance in an online mode, or an offline mode.

9. The anomaly monitoring system of claim 1, wherein the at least one plugin module is selected from the group consisting of: Application Monitor Plugin module; Network Payload Monitor Plugin module; Machine Learning Anomaly Detection Plugin module; SYS Call Monitor Plugin; and combinations thereof.

10. The anomaly monitoring system of claim 1, wherein the communication network is wireless communication network.

11. The anomaly monitoring system of claim 10, wherein the wireless communication network is selected from the group consisting of: WiFi, Bluetooth, cellular networks, and combinations thereof.

12. The anomaly monitoring system of claim 1, wherein the transmission of data from the PLC data collection module includes one or more of aspects of the PLC selected from the group consisting of: memory utilization, cpu utilization, disk input/output (i/o) activity, disk usage, and network i/o activity, and combinations thereof.

13. The anomaly monitoring system of claim 1, where in the at least one plugin module to monitor the performance of the monitored component and the PLC is configured to execute an algorithm including at least the steps of: (1) data collection by monitoring and collecting data output by at least one sensor associated with the at least one programmable logic controller and monitored component (2) pre-processing and feature extraction by parsing the collected data, analyzing analyzing and identifying features within the collected data for further analysis (3) comparison and classification of identified features within the collected data to a model library of representative patterns and identifying collected data as indicative of normal or anomalous behavior, and (4) logging and response generation by directing a portion of the data or classification of identified features to at least one of memory and database and optionally initiating a response in operation of the monitored component.

* * * * *